United States Patent [19]

Auletti

[11] Patent Number: 4,482,513
[45] Date of Patent: Nov. 13, 1984

[54] METHOD OF MOLDING FOAM/ALUMINUM FLAKE MICROWAVE LENSES

[75] Inventor: Craig R. Auletti, Upland, Calif.

[73] Assignee: General Dynamics, Pomona Division, Pomona, Calif.

[21] Appl. No.: 516,337

[22] Filed: Jul. 22, 1983

Related U.S. Application Data

[62] Division of Ser. No. 242,503, Mar. 10, 1981, abandoned.

[51] Int. Cl.³ .............................................. B29D 27/04
[52] U.S. Cl. ...................................... 264/39; 249/141; 249/142; 264/45.1; 264/45.3; 264/46.9; 264/255; 343/909; 343/910; 343/911 R; 425/812; 425/817 R; 521/123
[58] Field of Search .................... 264/45.3, 46.9, 39, 264/45.1, 255; 521/123; 343/909, 910, 911 R; 425/812, 817 R; 249/141, 142

[56] References Cited

U.S. PATENT DOCUMENTS

| 2,956,281 | 10/1960 | McMillan et al. | 343/911 R X |
| 2,975,488 | 3/1961 | Brauner | 264/45.3 |
| 3,129,191 | 4/1964 | Nickerson et al. | 521/123 X |
| 3,255,451 | 6/1966 | Wolcott | 343/911 R X |
| 3,256,218 | 6/1966 | Knox | 264/45.3 X |
| 3,274,668 | 9/1966 | Horst | 343/911 R X |
| 3,640,920 | 2/1972 | Cear | 521/123 X |
| 3,644,236 | 2/1972 | Macoustra | 521/123 X |
| 4,123,599 | 10/1978 | Hilterhaus et al. | 521/123 |
| 4,207,400 | 6/1980 | Dahms | 521/123 X |
| 4,308,226 | 12/1981 | Wingard | 264/45.3 |

FOREIGN PATENT DOCUMENTS

3044682 6/1982 Fed. Rep. of Germany ..... 264/45.3

*Primary Examiner*—Philip Anderson
*Attorney, Agent, or Firm*—Neil F. Martin; Freling E. Baker; Edward B. Johnson

[57] ABSTRACT

A microwave lens is constructed of a homogeneous body of closed cell rigid polyurethane foam with aluminum flakes dispursed throughout and having a configuration defining an axis and opposed lens surfaces. The method of the invention includes selecting a mold having a cavity of the appropriate configuration, preheating the mold, and filling the mold with a mixture of low density polyurethane foam components and fine aluminum flakes evenly dispersed throughout the foam structure allowing the mixture to cool and form a body of the appropriate configuration.

15 Claims, 13 Drawing Figures

ALLOW TO COOL

WAX & BUFF MOLD SURFACE

PREHEAT MOLD & COVER

MIX FLAKES WITH ISOCYANATE COMPONENT

POUR MIX IN MOLD & SECURE COVER

ALLOW TO COOL

POUR MIX IN MOLD &
SECURE COVER WITH
PLUG ATTACHED

ALLOW TO COOL

REMOVE PLUG, POUR
NEW MIX IN CAVITY
& REPLACE COVER

FOAM FILLS CAVITY

METHOD OF MOLDING FOAM/ALUMINUM FLAKE MICROWAVE LENSES

This is a division of application Ser. No. 242,503 filed Mar. 10, 1981 and now abandoned.

BACKGROUND OF THE INVENTION

The present invention relates generally to lenses and pertains particularly to microwave lenses and method of making the same.

Lenses are typically constructed by selecting a body of material having the appropriate dielectric constant and shaping or forming a body of the material into the desired configuration. Materials having the appropriate, dielectric constant for microwaves are typically fairly heavy and are generally unsuitable for use on airframes wherein weight is a major consideration. In addition, the process of forming such lenses is time consuming and expensive.

Another approach to the construction of lenses for microwave usage is disclosed in U.S. Pat. No. 2,716,190 issued Aug. 23, 1955 to E. B. Baker. This patent discloses the construction of microwave lenses from a material of styrene foam having particles of magnesium or aluminum embedded therein. The aluminum and magnesium particles are in the form of rods, spheres or planes with rods and spheres being preferred.

Another patent which is of interest in connection with the construction of microwave lenses is U.S. Pat. No. 3,129,191 issued Apr. 14, 1964 to Nickerson et al. This patent discloses the construction of dielectric foam materials for making microwave lenses. This patent discloses the polypoxide resin foams having aluminum powder therein as a filler for adjusting the dielectric constant.

Other patents of interest in connection with the subject invention are as follows:

U.S. Pat. No. 2,923,934 entitled "Method and Means For Minimizing Reflection of High Frequency Radio Waves", issued Feb. 2, 1960 to Halpern.

U.S. Pat. No. 2,954,552 entitled "Reflecting Surface and Microwave Absorption Layer", issued Sept. 27, 1960 to Halpern.

U.S. Pat. No. 3,079,289 entitled "High Dielectric Constant Material and Method of Making Same", issued Feb. 26, 1963 to George Jr. et al.

While various methods and means of making microwave lenses are known, it is desirable that more effective lightweight and inexpensive lenses be available.

SUMMARY AND OBJECTS OF THE INVENTION

It is therefore the primary object of the present invention to provide an improved microwave lens and method of making same.

In accordance with the primary aspect of the present invention a microwave lens is constructed of a body of polyurethane material having aluminum flakes dispersed therethrough and molded into the desired lens configuration.

The method of the present invention includes the steps of selecting a mold having a cavity of the desired configuration, heating the mold to a desired temperature, filling the mold with polyurethane components having aluminum flakes mixed therein in the desired proportion to obtain the desired dielectric constant and providing controlled venting of the mold to obtain a lens of the desired homogeneous dielectric constant.

BRIEF DESCRIPTION OF THE DRAWINGS

The above and other objects and advantages of the present invention will become apparent from the following description when read in conjunction with the drawings wherein.

DETAILED DESCRIPTION OF A PREFERRED EMBODIMENT

The present invention involves the construction of highly stable and homogeneous lightweight microwave lenses. These lenses in accordance with the present invention are constructed of a polyurethane foam and more particularly an expandable closed cell rigid polyurethane foam doped with aluminum flakes for selectively adjusting the dielectric constant of the lens to a desired constant within the range of from 1.15 to 5.0. Such lenses constructed in accordance with this invention can have a dielectric constant of up to 5.0 without a significant increase in the loss tangent. The lens is high strength, lightweight, and heat resistant.

Lenses constructed of the polyurethane material in accordance with the present invention having the appropriate sized aluminum flakes are a considerable improvement over the polystyrene constructions of the prior art. A comparison of the characteristics of polyurethane and polystyrene is disclosed in the following table.

| PROPERTY | POLYURETHANE | POLYSTYRENE |
|---|---|---|
| Maximum continuous use temperature (degrees F.) | 275 | 150 |
| Coefficient of thermal expansion (in/in/degrees F.) | $2.0 \times 10^{-5}$ | $4.0 \times 10^{-5}$ |
| Compressive strength (psi) | 250 | 125 |
| Tensile strength (psi) | 210 | 120 |
| Flexural strength (psi) | 310 | 250 |

Additional advantages of the present process and structure over that disclosed for example in the Baker patent above is that the curing cycle of the present invention requires about two hours cooling at room temperature. The process of the Baker patent however, requires a curing cycle of three days at 90 degrees C. and three more days at 100 degrees C. In addition, the maximum continuous temperature or use temperature of polypropylene is 230 degrees F. and has a coefficient of thermal expansion of $5.8 \times 10^{-5}$ inch per inch, per degree F. Even with the added polypropylene the Baker construction will still blister around 200 degrees F. leaving the lens useless as a focusing device. Other advantages and features will become apparent during the following discussion.

Figure 1:
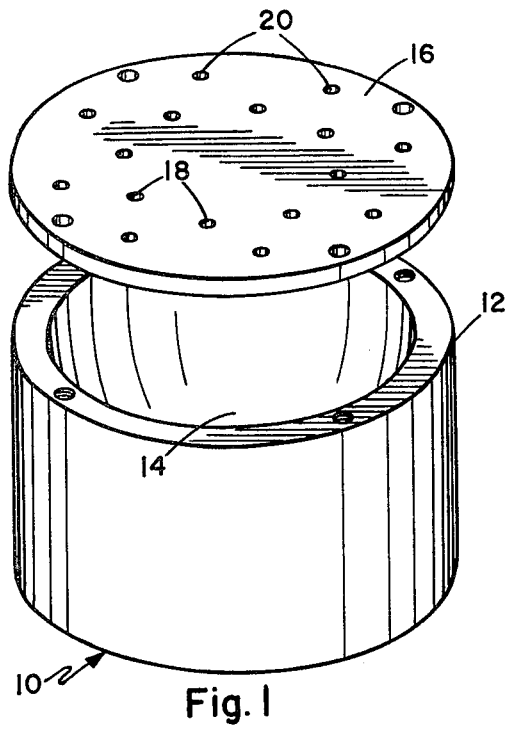
FIG. 1 is a perspective view of a typical mold and separated cover.

Turning to FIG. 1 of the drawings, a mold designated generally by the numeral 10 having a body 12 with a mold cavity 14 of the desired configuration is either selected or constructed. The mold may be made of any suitable material such as an aluminum, for example, and includes a cover 16 for closing the mold. The mold is provided with inner and outer concentric circles of vent holes 18 and 20 respectively. These vent holes are arranged along a radius and at a 45 degree angle to one another around the center axis of the mold. The vent holes are arranged and selected to provide a uniform appropriate venting of the entire mold to permit the material therein to expand and provide a homogeneous lens body. The outer vent holes 20 are likewise at a 45 degree angle to one another, but offset from the inner hole angles. The outer holes 20 are also located closely adjacent the outer wall of the mold cavity.

Figure 2:
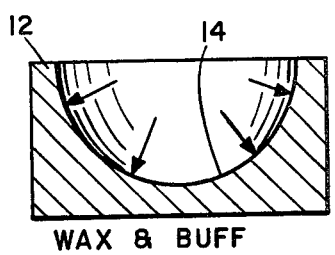
FIGS. 2–6 illustrate diagramatically the steps of making a microwave lens in accordance with the invention.
Figure 3:
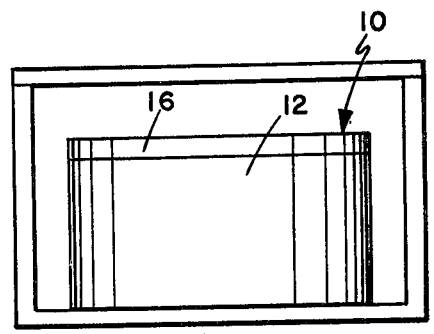
Figure 4:
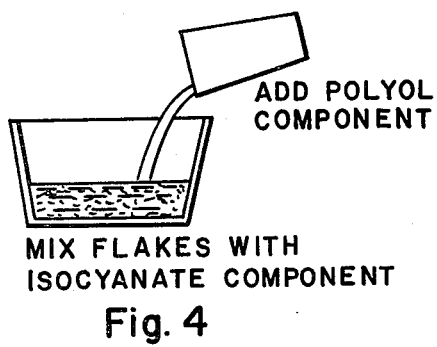
Figure 5:
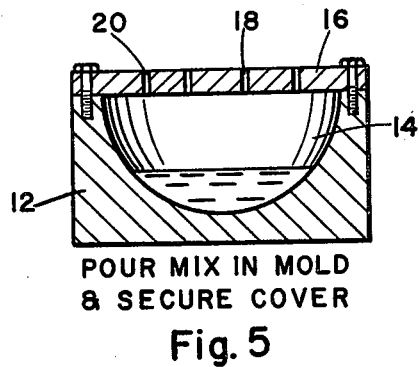
Figure 6:
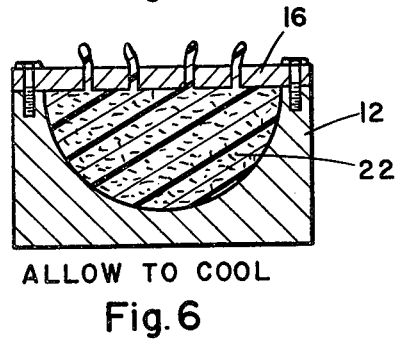
Figure 7:
FIG. 7 illustrates a finished lens constructed in accordance with the invention.

Turning to FIG. 2, the wall surface of the mold cavity is appropriately polished to obtain a finish on the order of about 6 microns using, for example, diamond dust as a cutting medium. This highly polished surface is then coated with three coats of a carnauba based wax and buffed out to provide an easy removal of the lens after forming.

The lens and cover are then heated to an appropriate preselected temperature of about 105 degrees plus or minus 5 degrees F. for twenty minutes. This heating can be accomplished, for example, by placing the mold and cover in a convection oven.

After the mold is preheated the components of polyurethane are selected in the appropriate proportions for the size mold and an appropriate amount of fine aluminum flakes on the order of about 325 mesh are added with the isocyanate component of the polyurethane. After this is mixed, then the polyol component is added to this mixture and the mixture is stirred or mixed for approximately 15 seconds and then poured into the mold cavity. The cover is then bolted on and the expanding foam allowed to sprue through the vent holes.

After the mold has cooled to room temperature, the aluminum cover is removed and the lens pulled from the cavity. This provides a lens of a convex, hemispherical surface of an extremely smooth character. The lens formed by this method is also homogeneous and has a substantially uniform dielectric constant throughout.

The weight of lenses in accordance with this method over conventional lenses result in a weight reduction of approximately 7 to 1.

By way of example a lens 22 was constructed in accordance with the invention utilizing a 10 inch hemispherical aluminum cavity which was machined by using a tracer lathe and template. A mold cover with vent holes appropriately located to allow a stream of freon and water vapors produced from the exothermic reaction of the polyurethane foam was also made. After machining, the cavity mold and cover was polished to a 6 micron finish using diamond dust as the cutting medium. The highly polished cavity of the mold was then coated with three coats of a carnauba based wax and buffed out. The mold and cover were then placed in the convection oven and heated to a temperature of about 105 degrees F. for about 20 minutes.

A two pound per cubic foot polyurethane foam was used to obtain a low weight to volume ratio. Three-hundred grams each of the polyol and isocyanate components were weighed out. One-hundred and thirty grams of fine aluminum flake or approximately 320 mesh was added to the isocyanate component. The size of the flake is critical because larger flakes will cause the cell size of the lens to increase dramatically resulting in a decrease in homogeneity. The 300 grams of polyol was then added to the mixture of 130 grams of aluminum and 300 grams isocyanate and mixed for approximately 15 seconds. This mixture was then poured into the cavity mold and the cover bolted on allowing the foam to sprue through the vent holes.

After the mold had cooled to room temperature, the cover was removed and the microwave lens pulled from a cavity, completing the prior fabrication sequence. This gave a lens having an extremely smooth convex hemispherical outer surface. The lens produced in this fashion was then tested for uniformity of dielectric constant. A cross section of the lens indicated the homogeneity of the lens.

Figure 8:
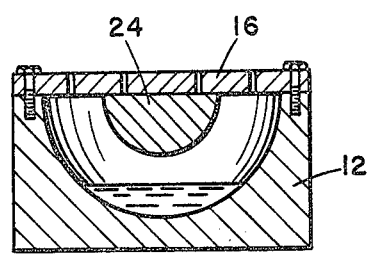
FIGS. 8–11 illustrates diagramatically the steps of making an alternate embodiment of the lens.
Figure 9:
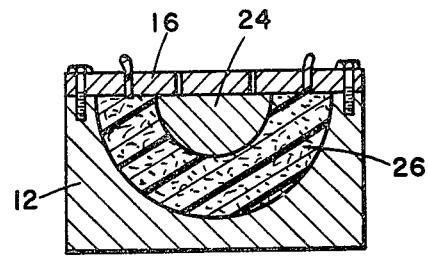
Figure 10:
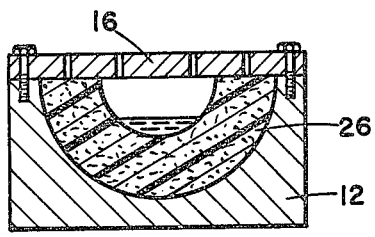
Figure 11:
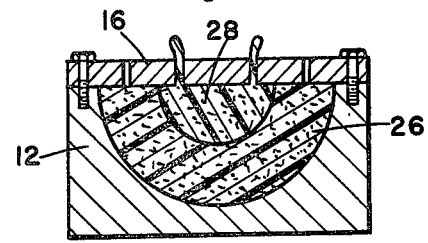
Figure 12:
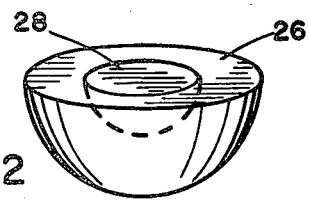
FIG. 12 illustrates an alternate lens construction.

Turning now to FIGS. 8-11 the steps of construction to an alternate lens of a multi-dielectric constant is illustrated. In this method, the same mold as in the previous embodiment may be utilized with the exception of the addition as illustrated in FIG. 8 of an insert 24 which in this illustration is of a generally hemispherical configuration. This insert is primarily of the configuration of the mold cavity and of a size to construct a first layer or lens section in the cavity 14 between the cavity walls and the insert 24 of the desired thickness. The polyurethane components are mixed as in the previous embodiment, utilizing a preselected amount of aluminum flakes to obtain the appropriate dielectric constant for the cover portion of the lens. This material is placed in the cavity of the mold 14 as in the previously described steps and the cover including the plug or insert 24 is installed and the outer portion 26 of the lens is allowed to form. Upon formation of this portion of the lens as shown in FIG. 9, the cover is then removed and the plug or insert 24 is removed and an appropriate mixture of polyurethane and aluminum flake to obtain a second dielectric constant for the inner portion 28 is placed within the cavity as shown in FIG. 10. The cover is again installed and the inner portion 28 of the lens is allowed to form as shown in FIG. 11. This forms a lens having two different portions with different dielectric constants as shown in FIG. 12. The illustrated proportions are solely for ease of illustration and not intended as a limitation on the proportion.

Lenses according to these two embodiments were constructed and tested and the multi-dielectric lens and the homogeneous dielectric lens were found in tests to be substantially equally effective. The configuration of the multi-dielectric lens tested had a outer shell of about ¼ inch with a dielectric constant of about 2.0 and the remaining portion having a dielectric constant of 3.0. This was in the configuration of a 10" hemispherical lens. This was tested against a 10" homogeneous lens and both were found to be substantially equally effective in increasing the gain and reducing the boresight errors for planar spiral antennas. It is apparent that the dielectric lenses were effective in providing increased directivity with reduced boresight errors. The results of the tests indicated a measured electrical/mechanical boresight deviation well within plus or minus 1 degree over the entire frequency band of interest.

While the present tests failed to provide any indication of an advantage for the multi-dielectric lens, it is possible that such a lens may be preferred in certain applications. The present tests, however, indicated that the homogeneous dielectric lens would be preferred in most installations because of the simplicity of fabrication.

Numerous lenses were constructed utilizing various size and configuration of aluminum particles. However, it was found that the the most satisfactory particles for obtaining a uniform and homogeneous dielectric constant was flake on the order of approximately 45 microns in size. Aluminum flakes of 80 microns in size were tested and found to create large voids and non-uniform lenses even at small percentage loadings. Other materials and sizes of aluminum materials were tested but proved unsatisfactory.

Figure 13:
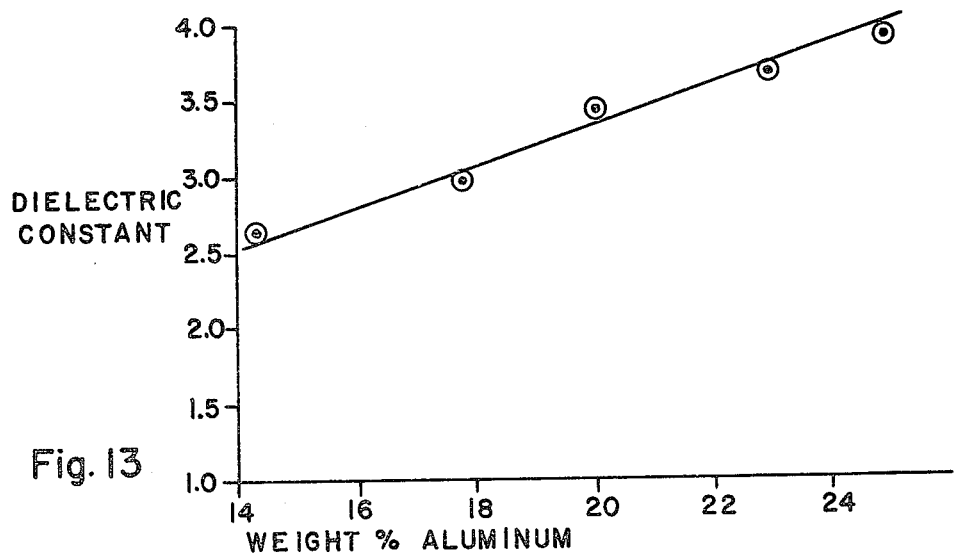
FIG. 13 illustrates graphically the relationship between the dielectric constant and percentage by weight of aluminum in the lens.

Turning to FIG. 13, a plot or graph of dielectric constant in the range of between 2.5 and 4 as against the percentage weight of aluminum is plotted. It was found that 17.8 percent by weight was the optimum loading to obtain a dielectric constant of 3.0.

While I have illustrated and described my invention by means of specific embodiments, it is to be understood that numerous changes and modifications may be made therein without departing from the spirit and scope of the invention as defined in the appended claims.

I claim:

1. A method of making a microwave lens comprising the steps of:
   selecting a mold having a cavity of the desired configuration for the controlled directing of microwaves;
   polishing the walls of said cavity;
   preheating said mold to a predetermined temperature;
   selecting and preparing a mixture consisting of low density polyurethane foam components and fine aluminum flakes;
   filling said mold cavity with said mixture;
   selecting a venting cover having a predetermined venting characteristic;
   installing the cover on the mold cavity;
   allowing the mold to cool and simultaneously allowing the contents to expand and cool;
   opening said mold by removing said venting cover; and
   removing the formed lens from the mold.

2. The method of claim 1 wherein the step of polishing the walls of said mold includes polishing said cavity to a 6 micron finish.

3. The method of claim 1 including the steps of preparing said mixture of polyurethane foam and aluminum by the steps of mixing 13 parts of aluminum flakes within 30 parts isocyanate and then adding 30 parts polyol and mixing for a predetermined period of time.

4. The method of claim 1 wherein the step of selecting the mold includes selecting the vent cover to provide uniform venting over the entire mold for uniformly expanding the material in a manner to provide a homogeneous lens body.

5. The method of claim 4 wherein the step of selecting the mold cover includes selecting a cover having inner and outer concentric circles of vent holes arranged along a radius and at an angle of 45 degrees to one another around the center axis of the mold.

6. The method of claim 1 wherein the polyurethane foam components are selected to produce an expandable closed cell rigid polyurethane foam.

7. The method of claim 6 including the step of selecting said aluminum flakes comprises selecting said flakes to have a mesh of approximately 325.

8. The method of claim 7 wherein the step of heating said mold includes heating said mold to a temperature of about 105 degrees F. for a period of time of about twenty minutes.

9. The method of claim 6 including the steps of forming a first portion of said lens having a first dielectric constant, and
   forming a second portion of said lens having a second dielectric constant.

10. The method of claim 9 wherein:
    the step of forming a first portion of said lens having a first dielectric constant includes the step of selecting a venting cover having a plug attached for extending into the mold cavity;
    and the step of forming a second portion of said lens having a second dielectric constant includes removing said cover and filling the cavity formed by said plug with a mixture of low density foam components and aluminum flakes selected to provide the second dielectric constant.

11. The method of claim 10 including the step of selecting the dielectric constant by adjusting the percentage weight of aluminum flakes in said mixture.

12. The method of claim 8 wherein the step of selecting and preparing said mixture of polyurethane foam components and fine aluminum flakes includes selecting the quantity of aluminum flakes to provide a predetermined dielectric constant.

13. A method of making a microwave lens having at least one curved surface for the controlled directing of microwaves apprising the steps of:
    selecting a mold having a cavity of a predetermined configuration for shaping a lens for controlled passage of microwaves;
    polishing the walls of said cavity to a finish of about six micron;
    preheating said mold to a predetermined temperature of about 105° Fahrenheit for a period of about 20 minutes;
    selecting and preparing a mixture of a low density polyurethane foam components for producing an expandable closed cell rigid polyurethane foam and a quantity of metal flakes for establishing a lens of a predetermined dielectric;
    placing a selected quantity of said mixture in said mold cavity;
    selecting a venting mold cover having inner and outer concentric circles of vent holes arranged along a radius at an angle of about 45° to one another around the center axis of said mold to provide uniform venting of the entire mold for uniformly expanding the material in a manner to provide a lens body;
    installing the cover on the mold cavities;
    simultaneously allowing the contents of said mold cavity to expand and cool while allowing the mold to cool; and
    opening said mold and removing the resulting lens from the mold.

14. The method of claim 13 including selecting and preparing said mixture to produce a dielectric constant in a range from 1.15 to about 5.0 and a substantially constant loss tangent.

15. The method of claim 14 wherein said metal flakes are selected to be aluminum flakes of approximately 325 mesh.

* * * * *